(12) United States Patent
Beer et al.

(10) Patent No.: US 7,200,108 B2
(45) Date of Patent: Apr. 3, 2007

(54) METHOD AND APPARATUS FOR RECOVERY FROM FAULTS IN A LOOP NETWORK

(75) Inventors: Reginald Beer, Eastleigh (GB); Paul Nicholas Cashman, Alton (GB); Paul Hooton, Eastleigh (GB); Ian David Judd, Winchester (GB); Robert Frank Maddock, Christchurch (GB); Neil Morris, Southsea (GB); Robert Bruce Nicholson, Southsea (GB); Barry Douglas Whyte, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 10/150,446

(22) Filed: May 17, 2002

(65) Prior Publication Data
US 2003/0005352 A1    Jan. 2, 2003

(30) Foreign Application Priority Data
Jun. 29, 2001   (GB) ................................ 0115969.8
Jul. 13, 2001   (GB) ................................ 0117092.7

(51) Int. Cl.
*H04J 1/16*   (2006.01)
*H04L 12/66*  (2006.01)
*G06F 11/00*  (2006.01)
*G01R 31/28*  (2006.01)

(52) U.S. Cl. ............... 370/222; 370/225; 370/245; 370/463; 711/114; 714/4; 714/25; 714/717

(58) Field of Classification Search ........ 370/216–218, 370/221–222, 225, 227–228, 231, 235
See application file for complete search history.

(56) References Cited

U.S. PATENT DOCUMENTS 5,317,569 A  *  5/1994   Ralph et al. ................ 370/223

(Continued)

FOREIGN PATENT DOCUMENTS

EP          0549506 A2     6/1993

OTHER PUBLICATIONS

American National Standard for Information Technology "Fibre Channel Arbitrated Loop (FC-AL-2) Revision 7.0", Apr. 1, 1999.
American National Standard for Information Systems "SCSI-3 Enclosure Services Command Set (SES), Revision 8a", Jan. 16, 1997.

*Primary Examiner*—Chi Pham
*Assistant Examiner*—Melanie Jagannathan
(74) *Attorney, Agent, or Firm*—Harrington & Smith, LLP

(57)   ABSTRACT

A method and apparatus for recovery from faults in a loop network (400) is provided. The loop network (400) has a host means (402), a first loop and a second loop (406, 408), a plurality of ports (410) connected to each of the loops (406, 408) and a control device (414, 440) on or connected to each loop (406, 408) with bypass control over at least one of the ports (410) connected to the loop (406, 408). In the event of a failure on the first loop (406), the host means (402) instructs the bypassing of at least one port (410) on the first loop (406), the host means (402) sending the instructions via the control device (414, 440) on or connected to the second loop (408). The host means (402) may determine the physical topology of the ports (410) on the first and second loops (406, 408) such that when a failure is reported to the host means (402) by a port (432) on the first loop (406), the host means (402) instructs the bypassing of a port (434) in a specific relationship to the reporting port (432) on the first loop (434). The host means (402) may instruct the bypassing of all ports (416) on the first loop (406) and subsequently selectively un-bypass ports (416) to ascertain the location of a faulty port or ports.

20 Claims, 4 Drawing Sheets

U.S. PATENT DOCUMENTS

| | | | |
|---|---|---|---|
| 5,663,950 A * | 9/1997 | Lee et al. | 370/224 |
| 5,812,754 A * | 9/1998 | Lui et al. | 714/6 |
| 5,991,891 A * | 11/1999 | Hahn et al. | 714/4 |
| 6,101,166 A * | 8/2000 | Baldwin et al. | 370/222 |
| 6,201,787 B1 * | 3/2001 | Baldwin et al. | 370/222 |
| 6,219,753 B1 * | 4/2001 | Richardson | 711/114 |
| 6,282,188 B1 * | 8/2001 | Hashemi et al. | 370/351 |
| 6,862,690 B1 * | 3/2005 | Bezera et al. | 714/4 |
| 6,901,048 B1 * | 5/2005 | Wang et al. | 370/228 |
| 2001/0011357 A1 * | 8/2001 | Mori | 714/25 |
| 2002/0010881 A1 * | 1/2002 | White | 714/44 |

* cited by examiner

METHOD AND APPARATUS FOR RECOVERY FROM FAULTS IN A LOOP NETWORK

FIELD OF THE INVENTION

This invention relates to a method and apparatus for recovery from faults in a loop network. In particular, the invention relates to recovery from faults in Fibre Channel Arbitrated Loops. The invention could equally apply to recovery from faults in other unidirectional loops, for example, Token Ring networks, FDDI (Fibre Data Distributed Interfaces), etc.

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposal, American National Standard for Information Technology "Fibre Channel Arbitrated Loop (FC-AL-2) Revision 7.0", Apr. 1, 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port". A device which has connections for two loops has two ports.

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same devices in the form of dual loops. The aim of these loops is that a single fault should not cause both loops to fail simultaneously. However, some faults, for example in a protocol chip or microprocessor in a disk drive which is common to both loops, can cause both loops to fail. More than two loops can also be used.

FC-AL devices typically have two sets of connections allowing them to be attached to two FC-ALs. Thus, in a typical configuration, two independent loops exist and each device is physically connected into both loops. When the system is working optimally, there are two possible loops that can be used to access any device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. Most disk drive failures would cause the disk drive to request bypass; however, faults can occur in disk drives that do not request bypass and therefore do not prevent both loops from failing.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

A SES device is an example of an enclosure service device which manages a disk enclosure and allows the monitoring of power and cooling in an enclosure. The SES device also obtains information as to which slots in an enclosure are occupied. The SES device accepts a limited set of SCSI commands. SCSI Enclosure Services are described in the working draft proposed by the American National Standards for Information Systems "SCSI-3 Enclosure Services Command Set (SES), Revision 8a", 16 Jan. 1997.

SES devices may be dedicated SES nodes on the loop or alternatively there may be a disk drive that also supports the SES command set. For the purposes of this disclosure, either type of device will be referred to as an SES device.

It is an aim of the present invention to provide increased reliability, availability and serviceability in a loop network.

More particularly, the situation addressed by present invention is when one port of a device on or connected to a unidirectional loop network has become non-functional and this fault has not been detected by the device itself. It is the intention of the present invention to provide a method for determining the location of the faulty port and to enable the bypassing of the port.

DISCLOSURE OF THE INVENTION

According to a first aspect of the present invention there is provided a method for recovery from faults in a loop network, the loop network having a host means, a first loop and a second loop, a plurality of ports connected to each of the loops and a control device on or connected to each loop with bypass control over at least one of the ports connected to the loop, wherein the method comprises: in the event of a fault on the first loop resulting in the failure of the first loop, bypassing a specific port if the location of the fault is known by the host means; if the location of the fault is not known by the host means, selectively bypassing and re-introducing ports to locate the fault and bypassing one or more ports once the fault is located; and wherein the host means instructs the bypassing of a port on the first loop by sending instructions via the control device on or connected to the second loop, thereby isolating the fault and allowing recovery of the first loop.

The method may include the host means determining the physical topology of the ports on the first and second loops. The failure may be reported to the host means by a port on the first loop and the host means instructs the bypassing of a port in a specific relationship to the reporting port. The specific relationship may be the port before the reporting port in the first loop.

The host means may instruct the bypassing of all ports on the first loop. The method may include subsequently selectively un-bypassing ports to ascertain the location of a faulty port or ports, for example, using a binary search. The method may alternatively include the host means instructing the bypassing of a selected batch of ports on the first loop.

The loop network may include at least one enclosure, each enclosure having a control device with bypass control over the ports in that enclosure and wherein the method includes un-bypassing all ports on the first loop in one enclosure at once, if the first loop again fails, re-bypassing all the ports on the first loop in the enclosure and selectively un-bypassing individual ports in the enclosure.

The loop network may be a Fibre Channel Arbitrated Loop and the control device may be a SCSI Enclosure Services device.

According to a second aspect of the present invention there is provided a loop network with means for recovery from faults, the loop network comprising: a host means; a first loop and a second loop; a plurality of ports connected to each of the loops; a control device on or connected to each loop with bypass control over at least one of the ports connected to the loop; means for bypassing a specific port if the location of a fault is known by the host means; if the location of a fault is not known by the host means, means for selectively bypassing and re-introducing ports to locate the fault and means for bypassing one or more ports once the fault is located; and wherein the host means instructs the bypassing of a port on the first loop by sending instructions via the control device on or connected to the second loop, thereby isolating the fault and allowing recovery of the first loop.

The host means may have means for determining the physical topology of the ports on each of the loops.

The plurality of ports may be ports of disk drives and wherein each disk drive has a port connected to each of the first and second loops.

The loop network may include at least one enclosure, each enclosure having a control device with bypass control over the ports in that enclosure.

The loop network may include more than two loops in the network.

The loop network may be a Fibre Channel Arbitrated Loop and the control device may be a SCSI Enclosure Services device.

According to a third aspect of the present invention there is provided a computer program product stored on a computer readable storage medium comprising computer readable program code means for recovery from faults in a loop network, the loop network having a host means, a first loop and a second loop, a plurality of ports connected to each of the loops and a control device on or connected to each loop with bypass control over at least one of the ports connected to the loop, the program code means performing the steps of: in the event of a fault on the first loop resulting in the failure of the first loop, bypassing a specific port if the location of the fault is known by the host means; if the location of the fault is not known by the host means, selectively bypassing and re-introducing ports to locate the fault and bypassing one or more ports once the fault is located; and wherein bypassing of a port on the first loop is carried out by sending instructions via the control device on or connected to the second loop, thereby isolating the fault and allowing recovery of the first loop.

This invention also proposes a method and apparatus by which the SCSI Enclosure Services (SES) controllers, or any enclosure services controller, in an enclosure could provide assistance in a recovery procedure.

BRIEF DESCRIPTION OF THE DRAWINGS

Embodiments of the invention are now described, by means of examples only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripherals, in particular disk drives. The described embodiments are given in the context of FC-AL architecture although the described method and apparatus could be applied to any unidirectional loop network.

Figure 1:
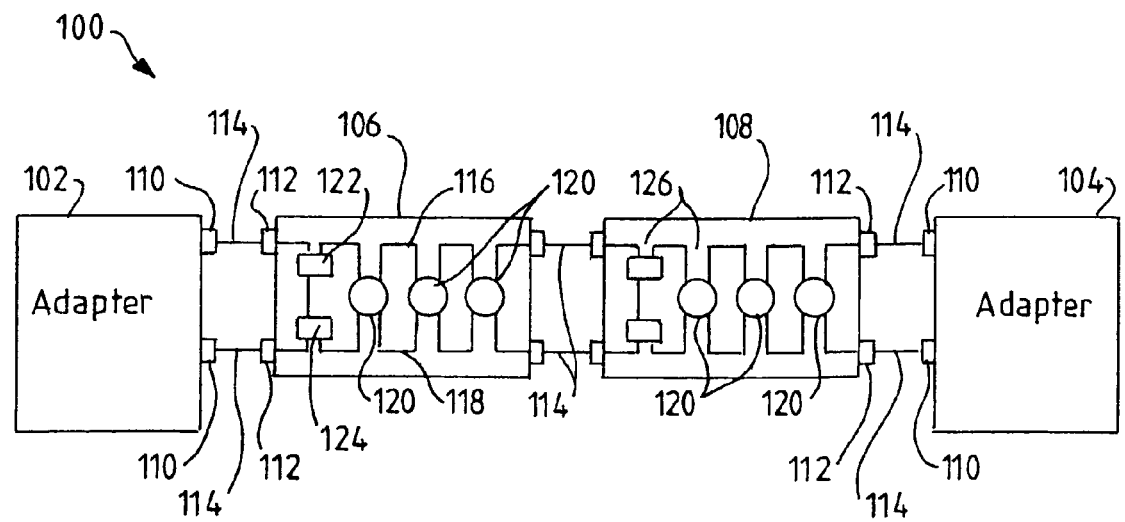
FIG. 1 is a diagram of a dual loop network in accordance with the present invention.

Referring to FIG. 1, a loop network 100 is shown in the form of a Fibre Channel Arbitrated Loop with two host bus adapters 102, 104. The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 each loop 116, 118 passes through its own SES (SCSI Enclosure Services) device or controller 122, 124 and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an SES device 122, 126. Each disk drive 120 or SES device 122, 126 has a bypass circuit to enable it to be bypassed by the loop, if required. The disk drives 120 are examples of dual port devices in that they are common to both the loops 116, 118 of the loop network 100.

An SES device 122, 124 is provided on each loop 116, 118 in each enclosure and the two SES devices 122, 124 are connected together through the enclosure's backplane. One SES device can be used to control the other SES device. An SES device manages an enclosure and provides a point of control for each enclosure. It can monitor parameters such as power and cooling and obtain information as to which slots for disk drives are occupied. It accepts a limited set of SCSI commands. SES devices can be used to instruct a bypass of a disk drive and to check which disk drives are bypassed.

The SES devices 122, 124 shown in FIG. 1 are provided as nodes in the loops 116, 118. These are referred to as "in loop" SES devices.

SES devices can also be provided by means of an Enclosure Services Interface (ESI) in which case the SES devices are not in the loop but are interfaced from one or more disk drives. SES devices of this nature are usually provided on a few disk drives in each enclosure. Commands can be sent to the SES device in an enclosure via the disk drive with the ESI.

Only disk drive enclosures that contain an SES device or some other form of enclosure services device are described. One purpose of the SES devices is to control the port bypass circuits for the ports of disk drives housed within the enclosure. The SES command set provides an Enclosure Control Page which allows the setting fo the bypass circuits to be specified. The SES device therefore allows the host bus adapter to use the standard SES interface to bypass the ports of individual disk drives in a loop as required. The same interface can be used to un-bypass the ports.

In the embodiment shown in FIG. 1, a dual loop network 100 is shown by way of example, with two enclosures 106, 108 each with three disk drives 120 and two SES controllers 122, 124, one for each loop. Typical loop networks may have one or two host bus adapters and a set of six or so disk drive enclosures each of which may typically contain a set of ten to sixteen disk drives.

Figure 2:
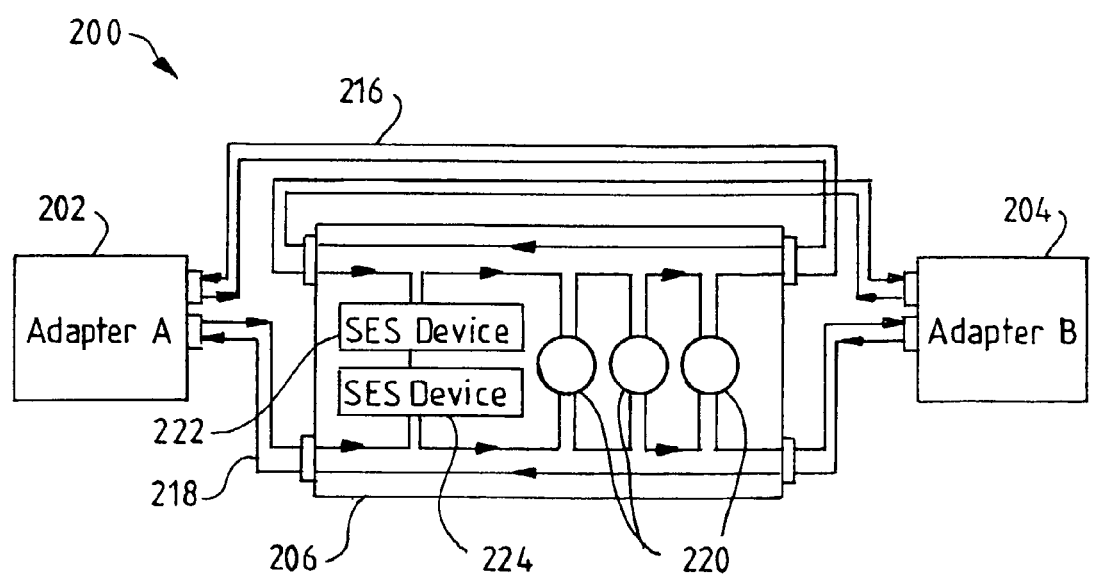
FIG. 2 is a diagram of a dual loop network in accordance with the present invention.

Referring to FIG. 2, a loop network 200 is shown with the complete path of two loops 216, 218 through a single enclosure 206 between two adapters 202, 204 in a loop network 200. On the top loop 216, a fibre channel signal leaving the first adapter 202 will first reach the second adaptor 204 and then the enclosure devices, in the form of an SES device 222 and the disk drives 220. On the bottom loop 218, a fibre channel signal leaving the first adapter 202 will first reach the enclosure devices in the form of an SES device 224 and the disk drives 220 and then will reach the second adapter 204. In this way the two loops 216, 218 may travel through the enclosure devices in the same order.

It is the nature of FC-AL architecture that each port connected to a loop needs to be functional in order for a loop initialisation procedure to complete which is a necessary requirement for the loop to operate. Therefore, enclosures include a mechanism for bypassing faulty ports in a loop, thereby removing the ports from the loop, allowing it to operate.

Figure 3:
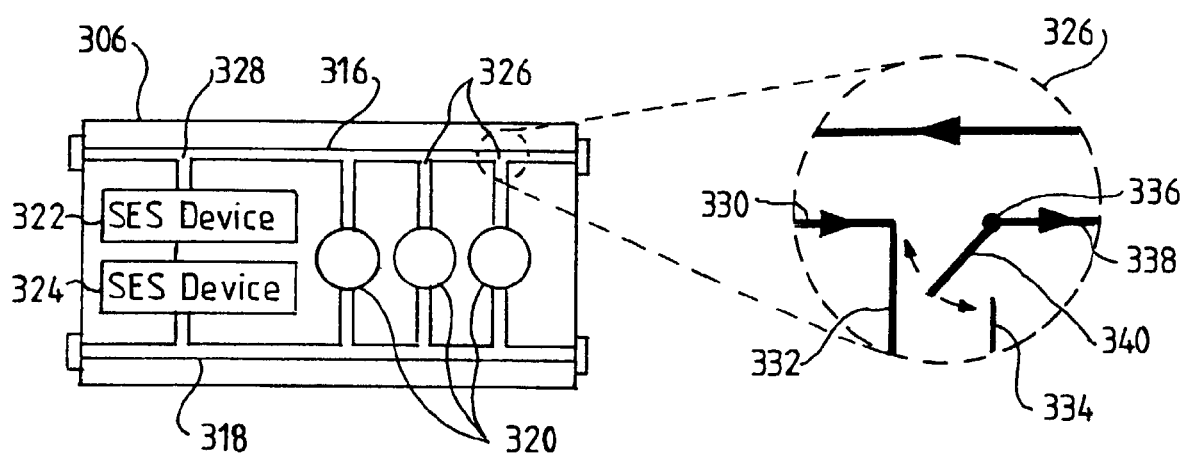
FIG. 3 is a diagram of a dual loop network with an enlarged view of a bypass circuit for a disk drive in the network.

Referring to FIG. 3, the bypass circuits provided in an enclosure are shown in more detail. An enclosure 306 is shown of the same form as the enclosure 206 of FIG. 2. The enclosure 306 may be one of several connected together in a loop network. The enclosure 306 has two loops 316, 318 each of which pass through common disk drives 320. A bypass circuit 326 is provided for each disk drive 320 on each loop 316, 318. Bypass circuits 328 are also provided for the SES devices 322, 324 on each loop 316, 318.

The inset of FIG. 3 shows a schematic diagram of the effect of a bypass circuit 326 in the first loop 316 in more detail. The loop has a path 330 travelling from left to right which is routed off along a path 332 at right angles to travel to a disk drive 320. The loop 316 returns from the disk drive 320 along a return path 334 parallel to the path 332 to the disk drive 320. The return path 334 meets a junction 336 and turns a right angle to continue the left to right path 338 of the loop 316 towards the next disk drive 320. The junction 336 in effect has a switch 340 which can join the left to right paths 330, 338 to bypass the disk drive 320.

Figure 4A:
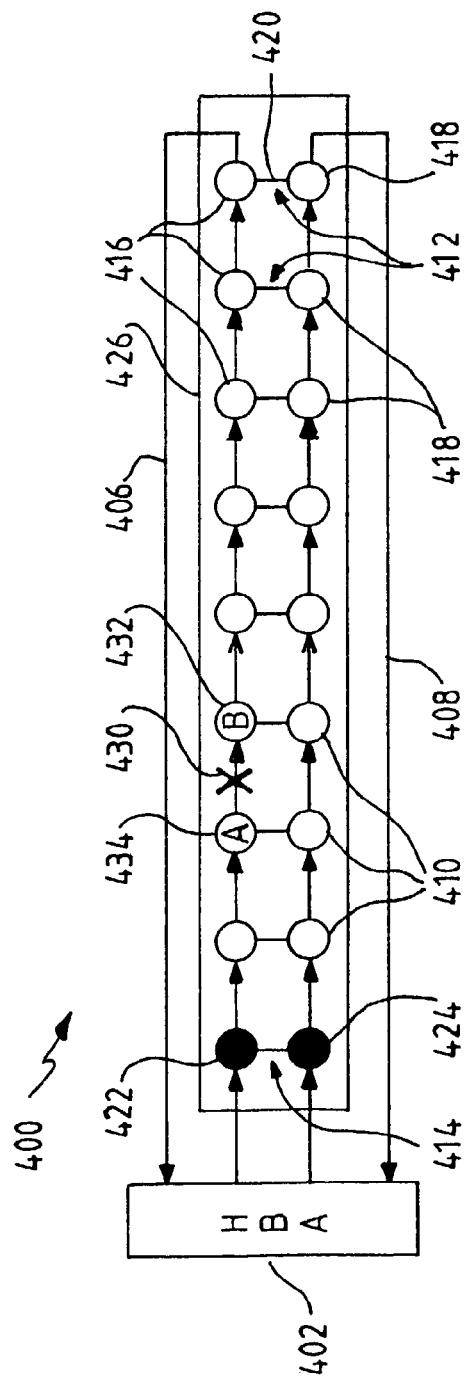
FIGS. 4A and 4B are diagrams of dual loop networks in accordance with the present invention including a fault in one of the loops.

FIG. 4A shows a loop network 400 with dual loops in the form of a first loop 406 and a second loop 408. This figure shows the ports 410 of the devices on or connected to the loops 406, 408. In this embodiment, the loop network 400 has a single host bus adapter 402 and eight devices are shown in an enclosure 426 with one SES device 414. Two communicating SES devices could be used with one on or connected to each loop 406, 408. The eight devices of this example are disk drives 412; however, other components could be connected in a similar manner. Each disk drive 412 has a first port 416 connected to the first loop 406 and a second port 418 connected to the second loop 408. The first and second ports 416, 418 are shown with a connection 420 between them to indicate that the first and second ports 416, 418 belong to a single disk drive 412. The SES device 414 has two SES node ports 422, 424.

Each port 410 on the first and second loops 406, 408 has a bypass circuit (not shown) as previously described in relation to FIG. 3.

FIG. 4A shows that a break 430 has occurred in the first loop 406 between port A 434 and port B 432. This has caused the first loop 406 to be non-functional. This means that there is no communication path along the broken first loop 406 to any of the devices in the form of the eight disk drives 412 and the SES device 414 on the first loop 406.

During initialisation of a loop, a Loop Initialisation Procedure (LIP) allows each port 410 to obtain an Arbitrated Loop Physical Address (AL_PA) that is unique within the loop 406, 408 for that port. This effectively uniquely identifies each port 410 in a loop 406, 408.

The loop initialisation involves one port winning as Loop Initialisation Master (LIM). The LIM port manages the initialisation procedure. Disk drives 412 can indicate that they do not wish to be the LIM. The Arbitrated Loop Physical Addresses (AL_PAs) are then allocated to each of the ports 410 in the loop 406, 408. The LIM sends a frame around the loop 406, 408 with bits corresponding to AL_PAs. Each port 410 finds the relevant bit for its AL_PA and changes the bit from "0" to "1" indicating that the AL_PA is not available for subsequent ports. The AL_PAs can be defined by previous addresses, assigned hardware addresses or software addresses. If there are multiple enclosures, each address indicates the enclosure and the device within the enclosure ensuring that each port 410 in a loop 406, 408 has a unique address.

The initialisation procedure can also send special frames around the loop 406, 408 called the Loop Initialisation Report Position (LIRP) frame and the Loop Initialisation Loop Position (LILP) frame which detail the topology of the loop as seen by the Loop Initialisation Master (LIM). This involves each port 410 indicating in a frame its AL_PA in the order that it is physically situated in the loop. This frame contains each port's AL_PA in turn as seen by the LIM for the whole of the loop and is broadcast around the loop.

The loop initialisation allows the host bus adapter 402 to know where each port 410 is in relation to the adapter 402. The host bus adapter 402 will identify all the devices in a loop including SES devices 414 as distinct from disk drives 412 and may also determine from the SES devices 414 details of the ports housed within that SES device's enclosure 426.

If an error occurs, as shown in FIG. 4A, and a loop 406 becomes broken, the next port 432 in the loop 406 sends a special loop initialisation primitive to the host bus adapter 402 indicating that it has detected the broken loop 406.

Figure 4B:
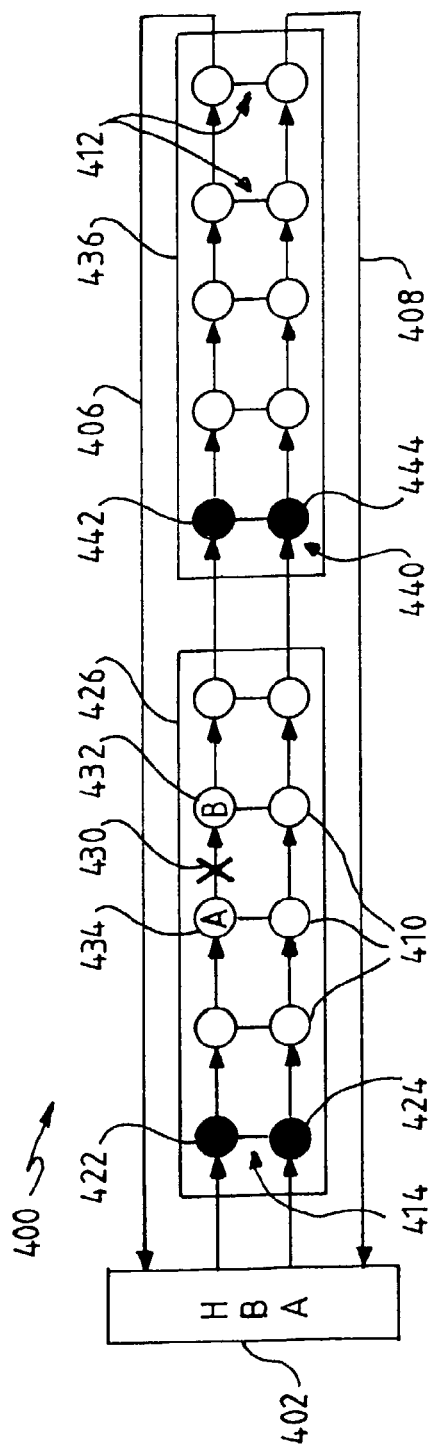

FIG. 4B shows a similar loop network 400 to FIG. 4A with two enclosures 426, 436 shown in the loop network 400. The second enclosure 436 also has a plurality of disk drives 412 and an SES device 440. The disk drives 412 have ports 410 on each of the first and second loops 406, 408 in the loop network 400. The SES device 440 of the second enclosure 436 has SES node ports 442 and 444 on the first and second loops 406, 408 respectively.

If there is a break 430 in the first loop 406, the present invention uses the second loop 408 for communication between the host bus adapter 402 and the SES device or devices 414 in each enclosure. Such communication allows the host bus adapter 402 to instruct the SES device 414 to bypass ports 416 of the disk drives 412 on the broken first loop 406. The host bus adapter 402 can send a command via the second loop 408 to the SES node port 424 on the second loop 408 to instruct the SES device 414 via SES node port 422 on the first loop 406 to bypass specific ports 416 on the first loop 406. The host bus adapter 402 can also command the SES device 414 via SES node port 424 on the second loop 408 to bypass all the ports 410 on the first loop 406 either including or excluding the SES node port 422 on the first loop 406.

In a situation in which the host bus adapter 402 knows the topology of the loop network 400, it knows the physical location of each disk drive 412 in each enclosure 426, 436 and a first recovery procedure can be followed.

In the first recovery procedure, when there is a single break 430 in a first loop 406 this is detected by port B 432 immediately following the break 430 in the loop 406. The host bus adapter 402 sees the error reported by port B 432. The host bus adapter 402 knows the topology of the first loop 406 due to the initialisation procedure and the LILP frame and it knows that port A 434 was the last port in the first loop 406 before the detected failure.

The host bus adapter 402 sends a command to the SES device 414 via SES node port 424 on the second loop 408 in the enclosure 426 in which port A 434 is housed. The second loop 408 is still operational as it does not contain a break. The command instructs the SES device 414 to bypass the disk drive 412 in the slot of the enclosure 426 housing the broken port A 434.

If the first loop 406 now manages to re-initialise, the recovery has been successful and no further action is required. The error has been detected and the faulty device 434 is no longer part of the first loop 406 and therefore the first loop 406 is fully operational.

This first recovery procedure will be effective as long as there is only one error in the loop. This procedure relies heavily on the ability to determine the precise physical location of the faulty device in the loop. If this does not work, there may be another failure, even possibly a failure of the SES node port's ability to bypass the faulty device. Loop initialisation must have previously succeeded so that each port has an address in the form of an AL_PA. If the first recovery procedure is not effective, a second recovery procedure can be carried out.

If the SES device 414 in the enclosure 426 in the first loop 406 is unable to bypass the disk drive 410 in the first loop 406 for some reason, and an error is returned, the only course of action is for the host bus adapter 402 to send another command to the SES device 414 to bypass all the ports 410 in the first loop 406 in the enclosure 426 including the SES node port 422.

It is possible that port B 432 which reported the failure is actually the source of the problem or that there are multiple errors in the first loop 406 prior to port B 432. There may also be later errors in the first loop 406 preventing the first loop 406 from recovering. It may be possible to distinguish between these sources of error; however, as the recovery procedure is the same, such distinction is not necessary.

The second recovery procedure can be used if the first recovery procedure does not result in reinstatement of the broken loop. The second recovery procedure can be used in the first instance if the physical arrangement of the devices in the loop is not known, for example, if the loop initialisation has failed. The second recovery procedure may simply be chosen by the host bus adapter as the default recovery method.

Firstly in the second recovery procedure, it is assumed that all the SES node ports 422, 424, 442, 444 in the enclosures 426, 436 are operational. The recovery option is to instruct the SES node port 424 in the second loop 408 to tell the SES node port 422 in the first loop 406 to bypass all ports 410 of the disk drives 412 in the first loop 406. If there is more than one enclosure 426, 436 in the loop network 400 as shown in FIG. 4B, the SES node ports 424, 444 on the second loop 408 in each enclosure 426, 436 are similarly instructed to tell the SES node ports 422, 442 in the first loop 406 to bypass all ports 410 in the first loop 406 except the SES node ports 422, 442 themselves. This means that only the SES node ports 422, 442 should remain in the first loop 406 and the first loop 406 should recover.

If the first loop 406 does not recover with only the SES node ports 422, 442 remaining in the first loop 406, then there is little to be done as the problem is no longer under the control of the host bus adapter 402 and the first loop 406 will remain broken. The loop network 400 can still operate using the second loop 408.

If the first loop 406 does recover with only the SES node ports 422, 442 remaining in the loop, the action is to instruct each SES node port 422, 442 in the first loop 406 in each enclosure 426, 436 in turn to un-bypass all the disk drives 412 in its enclosure. If such un-bypassing again breaks the loop 406, there is a solvable break in that enclosure. All the disk drives 412 in that enclosure 426, 436 should be bypassed again and then each disk drive 412 should be un-bypassed one at a time. As soon as the loop 406 breaks, the host bus adapter 402 will know which disk drive 412 is faulty. This can be applied to all disk drives 412 in the enclosure 426, 436, so that more than one faulty device can be located. Once the enclosure 426, 436 has been un-bypassed as much as possible, the next enclosure 426, 436 is tested, and so on. The result is that only the faulty devices are removed.

The host bus adapter 402 monitors the resultant effect of bypassing ports 416 on the broken first loop 406 in order to isolate the faulty device or devices and to leave them bypassed resulting in the previously broken first loop 406 containing only non-faulty devices 412.

If an SES node port 422, 442 in the first loop 406 in an enclosure 426, 436 is itself faulty and is unable to perform the requested bypass operation, all the devices including the SES node port 422, 442 in that enclosure 426, 436 are bypassed by the SES node port 424, 444 on the second loop 408 in that enclosure.

The host bus adapter 402 can take the view that since a loop 406 is broken, it can force all the ports 410 in the loop in all enclosures 426, 436 except the SES node ports 422, 442 to be bypassed immediately, and gradually re-introduce one enclosure 426, 436 at a time until all the enclosures 426, 436 are re-introduced.

Figure 5:
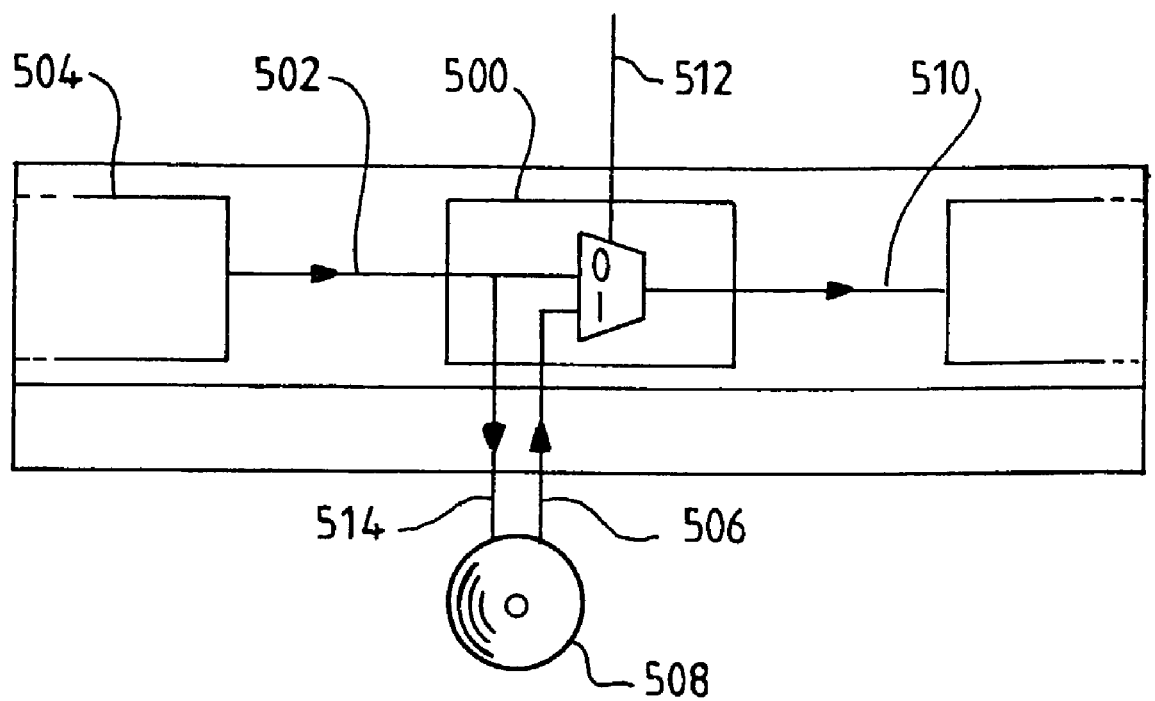
FIG. 5 is a diagram of a bypass circuit for a disk drive.

Referring to FIG. 5, a bypass circuit 500 is shown. The bypass circuit 500 has an incoming fibre channel signal 502 from the previous disk drive bypass circuit 504 in the loop. The bypass circuit 500 also takes in a fibre channel signal 506 (referred to as the drive out signal) from the disk drive 508 for which the bypass circuit 500 operates. These two fibre channel signals 502, 506 are the input signals to the bypass circuit 500. The bypass circuit 500 selects which one of the incoming fibre channel signal 502 and the drive out signal 506 will be routed to the fibre channel outgoing signal 510 from the bypass circuit 500.

The selection of the input signals 502, 506 is controlled by a port bypass control signal 512. The disk drive 508 is bypassed by the incoming fibre channel signal 502 being routed to the outgoing signal 510 if the port bypass control signal is "0".

The port bypass control signal 512 will send a signal to bypass the disk drive 508 in the following situations:

1. The disk drive 508 is requesting a bypass. This happens when a disk drive has performed an internal initialisation, it detects a failure mode, or it receives a primitive sequence instructing a bypass. If the disk drive itself is not present, the enclosure will assert a signal for the disk drive to be bypassed.
2. The SES node port 422, 442 for the first loop 406 containing the bypass circuit 500 wants to bypass the disk drive 508. This can be controlled by sending SES commands to the SES node port 424, 444 on the second loop 408.
3. The SES node port 424, 444 in the enclosure on the second loop 408 wants all the devices on the first loop 406 containing the disk drive 508 to be bypassed. A signal is asserted by the SES node port 424, 444 on the second loop 408 when a command has been received instructing it to bypass all devices on the first loop 406.

The port bypass control signal 512 will not bypass the disk drive 508 and will route the incoming drive out signal 506 to the outgoing signal 510 if the port bypass control signal is "1".

The port bypass control signal 512 will send a signal not to bypass the disk drive 508 in the following situations:

1. The disk drive 508 is not requesting a bypass.
2. The SES node port 422, 442 for the first loop 406 containing the bypass circuit 500 does not want to bypass the disk drive 508. This can be controlled by sending SES commands to the SES node port 424, 444 on the second loop 408.
3. The SES node port 424, 444 in the enclosure on the second loop 408 does not want all the devices on first loop 406 bypassed.

A logical AND is taken of the three inputs to form the port bypass signal 512 which means that if anything wants the disk drive 508 to be bypassed, it will be bypassed.

The incoming fibre channel signal 502 will always be transmitted 514 to the disk drive 508 but the disk drive output signal 506 is only selectively transmitted onwards along the loop. When a disk drive is bypassed it continues to receive the inbound signal but the outbound signal is disconnected. When the disk drive is bypassed by SES control, the disk drive does not know that it is bypassed and behaves as normal.

When a disk drive is un-bypassed, it rejoins the loop. The behaviour of the disk drive will depend on whether the disk drive has an address in the loop, if it does have an address it may rejoin the loop without disturbance. If the disk drive does not have an address, it will appear that the disk drive has logged out and the loop will not recognise the disk drive until the next network reconfiguration.

There are advantages of using the described recovery technique as opposed to using only the remaining working loop. First, a separate failure on the second loop in a dual loop network would result in total loss of access if the first loop has not been recovered. With a recovery technique as described one loop can be used to repair the second loop at all times. Secondly, the availability of both loops allows the loops to be used for data transfer, increasing the bandwidth capability of the system.

The invention is described in terms of using an SES device with the SES protocol. Any enclosure services controller device could be used in a similar manner. Similarly, reference is made to disk drives as examples of dual port devices. Any peripheral device, for example, an alternative form of storage device, could be substituted for a disk drive.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for recovery from faults in a loop network, the loop network having a host means, a first loop and a second loop, a plurality of ports connected to each of the loops and a control device coupled to each loop with bypass control over at least one of the ports connected to the loop, wherein the method comprises:
   in the event of a fault on the first loop resulting in the failure of the first loop,
   bypassing a specific port if the location of the fault is known by the host means;
   if the location of the fault is not known by the host means, selectively bypassing and re-introducing ports to locate the fault and bypassing at least one port once the fault is located; and
   wherein the host means instructs the bypassing of a port on the first loop by sending instructions via the control device coupled to the second loop, thereby isolating the fault and allowing recovery of the first loop.

2. A method as claimed in claim 1, wherein the method includes the host means determining the physical topology of the ports on the first and second loops.

3. A method as claimed in claim 2, wherein the failure is reported to the host means by a port on the first loop and the host means instructs the bypassing of a specific port in a given relationship to the reporting port.

4. A method as claimed in claim 3, wherein the given relationship is the port before the reporting port in the first loop.

5. A method as claimed in claim 1, wherein the host means instructs the bypassing of all ports on the first loop.

6. A method as claimed in claim 5, wherein the method includes subsequently selectively un-bypassing ports to ascertain the location of a faulty port or ports.

7. A method as claimed in claim 1, wherein the host means instructs the bypassing of a selected batch of ports on the first loop.

8. A method as claimed in claim 1, wherein the loop network includes at least one enclosure, each enclosure comprising a control device with bypass control over ports in that enclosure.

9. A method as claimed in claim 8, wherein the method includes un-bypassing all ports on the first loop in one enclosure at once, if the first loop again fails, re-bypassing all the ports on the first loop in the enclosure and selectively un-bypassing individual ports in the enclosure.

10. A method as claimed in claim 1, wherein the loop network is a Fibre Channel Arbitrated Loop and the control device is a SCSI Enclosure Services device.

11. A loop network with means for recovery from faults, the loop network comprising:
   a host means;
   a first loop and a second loop;
   a plurality of ports connected to each of the loops;
   a control device coupled to each loop with bypass control over at least one of the ports connected to the loop;
   means for bypassing a specific port if the location of a fault is known by the host means;
   means for selectively bypassing and re-introducing ports to locate the fault and means for bypassing at least one port once the fault is located, said means for selectively bypassing and said means for bypassing being operated if the location of a fault is not known by the host means; and
   wherein the host means instructs the bypassing of a port on the first loop by sending instructions via the control device coupled to the second loop, thereby isolating the fault and allowing recovery of the first loop.

12. A loop network as claimed in claim 11, wherein the host means has means for determining the physical topology of the ports on each of the loops.

13. A loop network as claimed in claim 11, wherein the plurality of ports are ports of disk drives and wherein each disk drive has a port connected to each of the first and second loops.

14. A loop network as claimed in claim 11, wherein the loop network includes at least one enclosure, each enclosure comprising a control device with bypass control over ports in that enclosure.

15. A loop network as claimed in claim 11, wherein the loop network comprises a Fibre Channel Arbitrated Loop and the control device comprises a SCSI Enclosure Services device.

16. A computer program product stored on a computer readable storage medium comprising computer readable program code means for recovery from faults in a loop network, the loop network having a host means, a first loop and a second loop, a plurality of ports connected to each of the loops and a control device coupled to each loop with bypass control over at least one of the ports connected to the loop, the program code means performing the steps of:
   in the event of a fault on the first loop resulting in the failure of the first loop,
   bypassing a specific port if the location of the fault is known by the host means;
   if the location of the fault is not known by the host means, selectively bypassing and re-introducing ports to locate the fault and bypassing at least one port once the fault is located; and
   wherein bypassing of a port on the first loop is carried out by sending instructions via the control device coupled to the second loop, thereby isolating the fault and allowing recovery of the first loop.

17. Apparatus comprising a part of a loop network for providing recovery from faults in said loop network, said loop newwork comprising host means, a first loop and a second loop, a plurality of ports connected to each of the loops and control means coupled to each loop and having bypass control over at least one of the ports connected to the loop, said apparatus comprising means, responsive to an occurrence of a fault on said first loop resulting in failure of said first loop, for bypassing a specific port if the location of the fault is known by said host means and, if the location of the fault is not known by said host means, for selectively bypassing ports and for re-introducing ports to locate the fault, and for bypassing at least one port when the fault is located; where bypassing of a port on the first loop for isolating the fault and permitting fauld recovery of said first loop is performed in response to at least one instruction sent via said control means that is coupled to said second loop.

18. Apparatus as in claim 17, wherein said loop network comprises at least one enclosure comprising a control means having bypass control over ports of that enclosure.

19. Apparatus as in claim 17, wherein said loop network comprises at least one enclosure comprising a plurality of disk drives.

20. Apparatus an in claim 17, wherein said loop network comprises a Fibre Channel Arbitrated Loop, and where said control means comprises a SCSI Enclosure Services device.

* * * * *